(12) United States Patent
Yokota et al.

(10) Patent No.: US 6,815,526 B2
(45) Date of Patent: Nov. 9, 2004

(54) WHOLLY AROMATIC POLYESTER AND POLYESTER RESIN COMPOSITION

(75) Inventors: Toshiaki Yokota, Fuji (JP); Kazunari Takada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 9 days.

(21) Appl. No.: 10/344,578

(22) PCT Filed: Sep. 17, 2001

(86) PCT No.: PCT/JP01/08056
§ 371 (c)(1), (2), (4) Date: Feb. 13, 2003

(87) PCT Pub. No.: WO02/24783
PCT Pub. Date: Mar. 28, 2002

(65) Prior Publication Data
US 2004/0044169 A1 Mar. 4, 2004

(30) Foreign Application Priority Data
Sep. 22, 2000 (JP) ........................ 2000-288413

(51) Int. Cl.$^7$ .............................................. C08G 63/02
(52) U.S. Cl. ....................... 528/272; 264/219; 359/642; 528/271
(58) Field of Search ........................ 264/219; 359/642; 528/271, 272

(56) References Cited

U.S. PATENT DOCUMENTS

| | | |
|---|---|---|
| 4,219,461 A | 8/1980 | Calundann |
| 4,256,624 A | 3/1981 | Calundann |

FOREIGN PATENT DOCUMENTS

| | | | |
|---|---|---|---|
| EP | 426481 | | 5/1991 |
| EP | 462481 | * | 5/1991 |
| JP | 56-10526 | | 2/1981 |
| JP | 5117374 | * | 5/1993 |
| JP | 8143653 | * | 6/1996 |

* cited by examiner

Primary Examiner—Terressa Boykin
(74) Attorney, Agent, or Firm—Nixon & Vanderhye P.C.

(57) ABSTRACT

There is provided a wholly aromatic polyester which has excellent heat resistance and can be produced by an ordinary polymerizer and melt-molded with ease. That is, a wholly aromatic polyester which contains, as essential constituents, the constitutional unit represented by the following general formula (I) in an amount of 40 to 75 mol %, the constitutional unit represented by the following general formula (II) in an amount of 8.5 to 30 mol %, the constitutional unit represented by the following general formula (III) in an amount of 8.5 to 30 mol % and the constitutional unit represented by the following general formula (IV) in an amount of 0.1 to 8 mol % based on the total of all constitutional units and which exhibits optical anisotropy in a molten state.

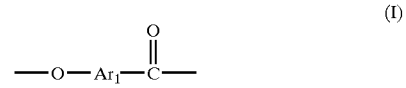
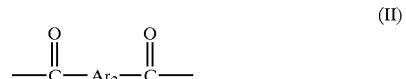
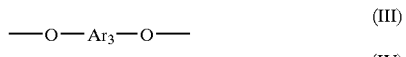
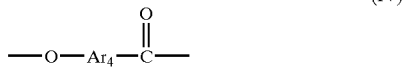

wherein $Ar_1$ is 2,6-naphthalene; $Ar_2$ is at least one selected from 1,2-phenylene, 1,3-phenylene and 1,4-phenylene; $Ar_3$ is at least one selected from 1,3-phenylene, 1,4-phenylene and the residue of a compound having at least two phenylene groups connected with each other at the para position; and $Ar_4$ is 1,4-phenylene.

9 Claims, No Drawings

WHOLLY AROMATIC POLYESTER AND POLYESTER RESIN COMPOSITION

This application is the US national phase of international application PCT/JP01/08056 filed 17 Sep. 2001 which designated the U.S.

FIELD TO WHICH THE INVENTION BELONGS

The present invention relates to a wholly aromatic polyester which is excellent in heat resistance and can be produced by an ordinary polymerizer and melt-molded with ease.

PRIOR ART

A wholly aromatic polyester which is currently on the market contains 4-hydroxybenzoic acid as a main component. However, since the homopolymer of 4-hydroxybenzoic acid has a higher melting point than a decomposition point, a variety of components must be copolymerized with 4-hydroxybenzoic acid to lower the melting point.

A wholly aromatic polyester containing 1,4-phenyhlenedicarboxylic acid, 1,4-dihydroxybenzene, 4,4'-dihydroxybiphenyl or the like as a copolymerizable component has a high melting point of not lower than 350° C., and the melting point is too high to melt-process the wholly aromatic polyester by an ordinary apparatus. Further, a variety of methods have been attempted to lower the melting point of such a wholly aromatic polyester having a high melting point to the temperature where the wholly aromatic polyester can be processed by an ordinary melt-processing apparatus. However, these methods have the problem that while the melting point can be lowered to some degree, mechanical strength at high temperatures (temperatures lower than but close to melting point) cannot be maintained.

To solve this problem, a copolyester containing a combination of 2-hydroxy-6-naphthoic acid, a diol component and a dicarboxylic acid component is proposed in JP-A 56-10526. However, this polyester has the problem that it solidifies quickly at the time of cooling, whereby the polymer is liable to solidify at the outlet of a polymerizer. Further, a copolyester containing a combination of 2-hydroxy-6-naphthoic acid, 4-hydroxybenzoic acid, a diol component and a dicarboxylic acid component is proposed in JP-A 55-144024. However, this polyester has problems in relation to heat resistance and melt-processability.

Heat resistance and moldability (melt-processability) are in a relationship of antimony. The higher the heat resistance of a polymer is, the higher molding temperature is required. Therefore, the degradation of the polymer is significant at the time of molding, thereby causing such problems as the formation of blisters in a molded article by the gas produced by the decomposition of the polymer (deformation by blistering), a deterioration in the color of a molded article (formation of streaks) and the susceptibility of a molded article to corrosion due to the gas components produced by a molding machine. A wholly aromatic polyester having high heat resistance and moldability in good balance is not yet provided at the present time.

DISCLOSURE OF THE INVENTION

The present inventors have made intensive studies to solve the above problems and to provide a wholly aromatic polyester which not only has excellent heat resistance but also can be melt-processed easily at low temperatures. As a result, they have found that it is effective for achieving the above objects to combine a 2-hydroxy-6-naphthoic acid unit and a 4-hydroxybenzoic acid unit in a specific limited ratio. The present invention has been completed by this finding.

That is, the present invention is a wholly aromatic polyester which exhibits optical anisotropy in a molten state and which contains, as essential constituents, the constitutional unit (I) in an amount of 40 to 75 mol %, the constitutional unit (II) in an amount of 8.5 to 30 mol %, the constitutional unit (III) in an amount of 8.5 to 30 mol % and the constitutional unit (IV) in an amount of 0.1 to 8 mol % based on the total of all constitutional units, the constitutional units (I) to (IV) being represented by the following formulas:

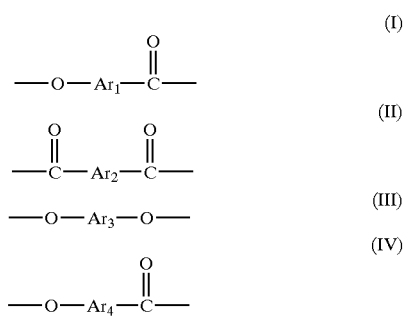

wherein $Ar_1$ is 2,6-naphthalene; $Ar_2$ is at least one selected from the group consisting of 1,2-phenylene, 1,3-phenylene and 1,4-phenylene; $Ar_3$ is at least one selected from the group consisting of 1,3-phenylene, 1,4-phenylene and the residue of a compound having at least two phenylene groups connected with each other at the para position; and $Ar_4$ is 1,4-phenylene.

DETAILED DESCRIPTION OF THE INVENTION

To obtain the above constitutional units (I) to (IV), a variety of ordinary ester-forming compounds are used. A description will be given to the compounds required as raw materials for forming the wholly aromatic polyester constituting the present invention hereinafter.

The constitutional unit (I) is obtained from 2-hydroxy-6-naphthoic acid.

The constitutional unit (II) is a dicarboxylic acid unit, and $Ar_2$ is selected from 1,2-phenylene, 1,3-phenylene and 1,4-phenylene. The constitutional unit (II) is preferably obtained from terephthalic acid from the viewpoint of heat resistance.

The constitutional unit (III) is a diol unit. As the compound used as its raw material, hydroquinone, dihydroxybiphenyl or the like is used. Dihydroxybiphenyl, particularly 4,4'-dihydroxybiphenyl, is preferred from the viewpoint of heat resistance.

Further, the constitutional unit (IV) is obtained from 4-hydroxybenzoic acid.

In the present invention, the wholly aromatic polyester must contain the above constitutional unit (I) in an amount of 40 to 75 mol % (preferably 40 to 60 mol %, more preferably 45 to 60 mol %), the above constitutional unit (II) in an amount of 8.5 to 30 mol % (preferably 17.5 to 30 mol %), the above constitutional unit (III) in an amount of 8.5 to 30 mol % (preferably 17.5 to 30 mol %) and the above constitutional unit (IV) in an amount of 0.1 to 8 mol % (preferably 1 to 6 mol %) based on the total of all constitutional units.

As described above, a copolyester containing the constitutional unit (I) in an amount of 10 to 90 mol %, the constitutional unit (II) in an amount of 5 to 45 mol % and the constitutional unit (III) in an amount of 5 to 45 mol % is proposed in JP-A 56-10526. This polyester has the problem that it solidifies quickly at the time of cooling, whereby the polymer is liable to solidify at the outlet of a polymerizer. To solve this problem so as to slow down the solidification of the polyester at the time of cooling and make the discharge of the polymer from the polymerizer possible, the present invention has incorporated 0.1 to 8 mol % of the constitutional unit (IV) into the polyester and controlled the proportions of the constitutional units (I) to (III) to the above ranges.

In addition, a copolyester containing the constitutional unit (I) in an amount of 20 to 40 mol %, the constitutional unit (II) in an amount of 5 to 30 mol %, the constitutional unit (III) in an amount of 5 to 30 mol % and the constitutional unit (IV) in an amount of 10 to 50 mol % is proposed in JP-A 55-144024. This copolyester has the problems that it has low heat resistance since the proportion of the constitutional unit (I) is small and the proportion of the constitutional unit (IV) is large and that the polymer is liable to solidify at the outlet of a polymerizer since the proportion of the constitutional unit (I) is small.

Under the circumstances, in the present invention, the above problems can be solved and a wholly aromatic polyester which is excellent in heat resistance, productivity and moldability can be obtained by maintaining the proportions of the constitutional units (I) to (IV) within the above ranges, particularly, by maintaining the ratio (I)/(IV) of the constitutional unit (I) to the constitutional unit (IV) within a range of 5 to 750 (preferably 6 to 150), in order to slow down the solidification of the polymer at the time of cooling moderately, to make the discharge of the polymer from the polymerizer possible and to optimize the crystallization of the polymer so as to improve heat resistance.

The wholly aromatic polyester of the present invention is polymerized by using a direct polymerization process or an ester exchange process. In the polymerization, a melt polymerization process, a solution polymerization process, a slurry polymerization process, a solid-phase polymerization process or the like is used.

In the present invention, an acylation agent for polymerization monomers and monomers having activated terminals as acid chloride derivatives are used in the polymerization. Illustrative examples of the acylation agent include acid anhydrides such as acetic anhydride.

A variety of catalysts can be used in these polymerizations. Representative examples of the catalysts include dialkyl tin oxides, diaryl tin oxides, titanium dioxide, alkoxy titanium silicates, titanium alcoholates, alkali metal salts and alkaline earth metal salts of carboxylic acids, and Lewis acid such as $BF_3$. The catalyst is used in an amount of generally about 0.001 to 1% by weight, particularly preferably about 0.003 to 0.2% by weight, based on the total weight of monomers.

When solution polymerization or slurry polymerization is carried out, a liquid paraffin, a synthetic oil having high heat resistance, an inert mineral oil or the like can be used as a solvent.

The reaction conditions are a reaction temperature of 200 to 380° C. and a final pressure to reach of 0.1 to 760 Torr (or 13 to 101,080 Pa). Particularly, in the melt reaction, the reaction temperature is 260 to 380° C., preferably 300 to 360° C., and the final pressure to reach is 1 to 100 Torr (or 133 to 13,300 Pa), preferably 1 to 50 Torr (or 133 to 6,670 Pa).

The reaction can be carried out by charging all the compounds as raw materials, an acylation agent and a catalyst into the same reactor and then initiating the reaction (one-step method) or by acylating the hydroxyl groups of the monomers (I), (III) and (IV) as raw materials with an acylation agent and then allowing the acylated hydroxyl groups of the monomers (I), (III) and (IV) to react with the carboxyl group of the monomer (II) (two-step method).

Melt polymerization is carried out by initiating a reduction of pressure after the inside of the reaction system reaches a predetermined temperature and reducing the pressure to a predetermined pressure. After the torque of an agitator reaches a predetermined value, an inert gas is introduced to increase the reduced pressure to a high pressure via normal pressure, and then a polymer is discharged from the reaction system.

The molecular weight of the polymer produced by the above polymerization method can be increased by solid-phase polymerization in which the polymer is heated in an inert gas at normal pressure or under reduced pressure. The preferable conditions for the solid-phase polymerization reaction are a reaction temperature of 230 to 350° C., preferably 260 to 330° C., and a final pressure to reach of 10 to 760 Torr (or 1,330 to 101,080 Pa).

To have both thermal stability and easy processability in the present invention, being a liquid crystal polymer which exhibits optical anisotropy in a molten state is an essential factor. The wholly aromatic polyester comprising the above constitutional units (I) to (IV) may not form an anisotropic molten phase depending on the constituents and the sequence distribution in the polymer. However, the polymer according to the present invention is limited to a wholly aromatic polyester which exhibits optical anisotropy in a molten state.

The melt anisotropy can be checked by conventional polarization spectroscopy using orthogonal polarizers. More specifically, the melt anisotropy is checked by melting a sample placed on the hot stage of Lincom Co., Ltd. and observing the sample in a nitrogen atmosphere at a magnification of 150× by use of the polarizing microscope of OLYMPUS OPTICAL CO., LTD. The above polymer is optically anisotropic and allows light to permeate the polymer when inserted between the orthogonal polarizers.

When the sample is optically anisotropic, light permeates the sample even when the sample is a molten, static fluid.

As a factor of easy processability of the present invention, liquid crystallinity and a melting point (temperature at which liquid crystallinity is exhibited) are conceivable. It is deeply concerned with the flowability of the polymer in a molten state whether the polymer exhibits liquid crystallinity. It is essential for the polyester of the present invention to exhibit liquid crystallinity in a molten state.

Since a nematic liquid crystalline polymer has a significant decrease in viscosity at a temperature equal to or higher than its melting point, it is generally a factor of easy processability to exhibit liquid crystallinity at a temperature equal to or higher than the melting point. The melting point (temperature at which liquid crystallinity is exhibited) is preferably as high as possible from the viewpoint of heat resistance. However, a melting point of not higher than 380° C. is a desirable measure in consideration of the thermal degradation of the polymer at the time of melt-processing the polymer, the heating capacity of a molding machine and the like.

When the polyester of the present invention has a melting point of 340 to 380° C. and a difference between its melting point and its softening temperature of not higher than 50° C., a liquid crystalline polymer that is hardly softened until it reaches high temperatures and that has moldability and heat resistance which are highly balanced can be obtained at relatively low molding temperatures. When the softening temperature is lower than the melting point by 50° C. or more, satisfactory heat resistance cannot be obtained relative to molding temperatures.

Further, the polyester of the present invention has a melt viscosity of preferably not higher than $1\times10^5$ Pa·s, more preferably not higher than $1\times10^3$ Pa·s, at temperatures higher than its melting point by 10 to 40° C. and a shear rate of 1,000 $\text{sec}^{-1}$. In general, these melt viscosities can be attained when the polyester of the present invention has liquid crystallinity.

In addition, the polyester of the present invention may contain a variety of fibrous, particulate and tabular inorganic and organic fillers.

Illustrative examples of fibrous fillers include inorganic fibrous materials such as glass fibers, asbestos fibers, silica fibers, silica alumina fibers, alumina fibers, zirconia fibers, boron nitride fibers, silicon nitride fibers, boron fibers, potassium titanate fibers, fibers of silicates., e.g., wollastonite, magnesium sulfate fibers, aluminum borate fibers, and fibers of metals, e.g., stainless steel, aluminum, titanium, copper and brass. A particularly representative fibrous filler is a glass fiber. In addition, organic fibrous materials having a high melting point such as polyamides, fluorocarbon resins, polyester resins and acryl resins may also be used.

Illustrative examples of particulate fillers include carbon black, graphite, silica, quartz powders, glass beads, milled glass fibers, glass balloons, glass powders, silicates such as calcium silicate, aluminum silicate, kaolin, clay, diatomaceous earth, wollastonite, metal oxides such as iron oxide, titanium oxide, zinc oxide, antimony trioxide, alumina, metal carbonates such as calcium carbonate and magnesium carbonate, metal sulfates such as calcium sulfate and barium sulfate, as well as ferrites, silicon carbide, silicon nitride, boron nitride and a variety of metal powders.

Illustrative examples of tabular fillers include mica, glass flakes, talc and a variety of metal foils.

Illustrative examples of organic fillers include synthetic fibers having heat resistance and high strength such as aromatic polyester fibers, liquid crystal polymer fibers, aromatic polyamides and polyimide fibers.

These inorganic and organic fillers may be used solely or in combination of two or more. A combination of fibrous fillers and particulate or tabular fillers is a preferable combination particularly in order for the polyester of the present invention to have mechanical strength, dimensional accuracy and electrical properties at the same time. The inorganic filler is contained in an amount of not larger than 120 parts by weight, preferably 20 to 80 parts by weight, based on 100 parts by weight of the wholly aromatic polyester.

When these fillers are used, a binder or a surface finishing agent may be used as required.

Further, other thermoplastic resin may also be added to the polyester of the present invention as an auxiliary in such an amount which does not impair the objects intended by the present invention.

Illustrative examples of thermoplastic resins used in this case include polyolefins such as polyethylene and polypropylene, aromatic polyesters produced from an aromatic dicarboxylic acid and a diol such as polyethylene terephthalate and polybutylene terephthalate, polyacetals (homopolymer or copolymer), polystyrene, polyvinyl chloride, polyamide, polycarbonate, ABS, polyphenylene oxide, polyphenylene sulfide and fluorocarbon resins. These thermoplastic resins may be used in admixture of two or more.

Effect of the Invention:

The wholly aromatic polyester of the present invention which comprises specific constitutional units and exhibits anisotropy in a molten state and its composition have good flowability in a molten state and excellent thermal stability and can be injection-molded, extruded or compression-molded into a variety of three-dimensional molded articles, fibers, films and the like without using a molding machine having a special structure since their moldable temperatures are not so high. The wholly aromatic polyester and composition thereof are particularly suitable for a relay switch part, a bobbin, an actuator, a noise reduction filter case or a hot fixing roller for OA equipment.

EXAMPLES

The present invention will be described in more detail with reference to Examples hereinafter. The present invention, however, shall not be limited thereto. The measurements of physical properties in Examples were carried out in accordance with the following methods.

[Melting Point]

This was measured by the DSC manufactured by PerkinElmer, Inc.

[Softening Temperature]

A 1-mm-thick disk was molded from the prepared polyester by a hot press. This molded article was heated at a heating rate of 10° C./min on a hot plate under a constant load of 1.82 MPa. The temperature at which a 1-mm-diameter needle under a load penetrates 5% of the thickness of the molded article was taken as a softening temperature.

[Heat Distortion Temperature]

This was measured at a measurement pressure of 1.8 MPa in accordance with IS075/A.

[Dischargeability of Polymer]

After the stirring torque of a polymerizer reached a predetermined value, nitrogen was introduced to increase a reduced pressure to a high pressure of 0.5 kg/cm$^3$ via normal pressure, and the behavior of a polymer discharged from the bottom of the polymerizer was observed.

[Melt Viscosity]

This was measured by Capirograph of Toyo Seiki Seisaku-Sho, Ltd. using an orifice having an internal diameter of 1 mm and a length of 20 mm at the measurement temperatures shown in Table 1 and a shear rate of 1,000 sec$^{-1}$.

Example 1

The following monomers as raw materials, metal catalyst and acylation agent were charged into a polymerizer equipped with an agitator, a reflux column, an inlet for introducing nitrogen and a decompression/discharge line, and the inside of the polymerizer was then substituted by nitrogen.

(I) 166 g (48 mol %) of 2-hydroxy-6-naphthoic acid (HNA)
(II) 76 g (25 mol %) of terephthalic acid (TA)
(III) 86 g (25 mol %) of 4,4'-dihydroxybiphenyl (BP)
(IV) 5 g (2 mol %) of 4-hydroxybenzoic acid (HBA)
22.5 mg of potassium acetate catalyst
191 g of acetic anhydride After the raw materials were charged into the polymerizer, the temperature of the reaction system was increased to 140° C. and the contents of the polymerizer were allowed to react at 140° C. for 1 hour. Thereafter, the temperature of the reaction system was further increased to 360° C. in 5.5 hours. Then, the internal pressure of the polymerizer was reduced to 5 Torr (or 667 Pa) in 30 minutes, and melt polymerization was carried out while acetic acid, excessive acetic anhydride and other low-boiling-point components were distilled out. After the stirring torque of the polymerizer reached a predetermined value, nitrogen was introduced to increase a reduced pressure to a high pressure via normal pressure. The polymer was discharged from the bottom of the polymerizer, and the strands were pelletized.

The obtained pellets were heat-treated under a current of nitrogen at 300° C. for 8 hours. The pellets had a melting point of 352° C. and a softening temperature of 320° C., and the difference between the melting point and the softening temperature was as small as 32° C.

Further, 66.7 parts by weight of milled glass fibers (PFB101, product of Nitto Boseki Co., Ltd.) was mixed into 100 parts by weight of the pellets by a twin screw extruder to obtain a wholly aromatic polyester composition in the form of pellets. After this wholly aromatic polyester composition was dried at 140° C. for 3 hours, it was injection-molded at a cylinder temperature of 370° C. by an injection molding machine (J75EP, product of Nikko K.K.). The composition exhibited good moldability. The obtained test piece had a heat distortion temperature of 298° C. and exhibited good heat resistance.

Example 2

A polymer was obtained in the same manner as in Example 1 except that the amounts of the raw materials were changed as follows.

(I) 186 g (54 mol %) of 2-hydroxy-6-naphthoic acid
(II) 68 g (22.5 mol %) of terephthalic acid
(III) 77 g (22.5 mol %) of 4,4'-dihydroxybiphenyl
(IV) 3 g (1 mol %) of 4-hydroxybenzoic acid
22.5 mg of potassium acetate catalyst
190 g of acetic anhydride Example 3

A polymer was obtained in the same manner as in Example 1 except that the amounts of the raw materials were changed as follows.

(I) 140 g (40 mol %) of 2-hydroxy-6-naphthoic acid
(II) 83 g (27 mol %) of terephthalic acid
(III) 94 g (27 mol %) of 4,4'-dihydroxybiphenyl
(IV) 5 g (6 mol %) of 4-hydroxybenzoic acid
22.5 mg of potassium acetate catalyst
194 g of acetic anhydride Comparative Example 1

A polymer was obtained in the same manner as in Example 1 except that the amounts of the raw materials were changed as follows.

(I) 17 g (4 mol %) of 2-hydroxy-6-naphthoic acid
(II) 66 g (18 mol %) of terephthalic acid
(III) 74 g (18 mol %) of 4,4'-dihydroxybiphenyl
(IV) 183 g (60 mol %) of 4-hydroxybenzoic acid
45 mg of potassium acetate catalyst
230 g of acetic anhydride Comparative Example 2

A polymer was obtained in the same manner as in Example 1 except that the amounts of the raw materials were changed as follows.

(I) 126 g (35 mol %) of 2-hydroxy-6-naphthoic acid
(II) 80 g (25 mol %) of terephthalic acid
(III) 89 g (25 mol %) of 4,4'-dihydroxybiphenyl
(IV) 40 g (15 mol %) of 4-hydroxybenzoic acid
22.5 mg of potassium acetate catalyst
199 g of acetic anhydride Comparative Example 3

A polymer was obtained in the same manner as in Example 1 except that the amounts of the raw materials were changed as follows.

(I) 178 g (50 mol %) of 2-hydroxy-6-naphthoic acid
(II) 55 g (17.5 mol %) of terephthalic acid
(III) 62 g (17.5 mol %) of 4,4'-dihydroxybiphenyl
(IV) 39 g (15 mol %) of 4-hydroxybenzoic acid
22.5 mg of potassium acetate catalyst
197 g of acetic anhydride Comparative Example 4

A polymer was obtained in the same manner as in Example 1 except that the amounts of the raw materials were changed as follows.

(I) 124 g (35 mol %) of 2-hydroxy-6-naphthoic acid
(II) 89 g (28.5 mol %) of terephthalic acid
(III) 100 g (28.5 mol %) of 4,4'-dihydroxybiphenyl
(IV) 21 g (8 mol %) of 4-hydroxybenzoic acid
22.5 mg of potassium acetate catalyst
196 g of acetic anhydride Comparative Example 5

A polymer was obtained in the same manner as in Example 1 except that the amounts of the raw materials were changed as follows.

(I) 74 g (20 mol %) of 2-hydroxy-6-naphthoic acid
(II) 98 g (30 mol %) of terephthalic acid
(III) 110 g (30 mol %) of 4,4'-dihydroxybiphenyl
(IV) 54 g (20 mol %) of 4-hydroxybenzoic acid
22.5 mg of potassium acetate catalyst
204 g of acetic anhydride Comparative Example 6

A polymer was obtained in the same manner as in Example 1 except that the amounts of the raw materials were changed as follows.

(I) 270 g (80 mol %) of 2-hydroxy-6-naphthoic acid
(II) 27 g (9 mol %) of terephthalic acid
(III) 30 g (9 mol %) of 4,4'-dihydroxybiphenyl
(IV) 5 g (2 mol %) of 4-hydroxybenzoic acid
22.5 mg of potassium acetate catalyst
187 g of acetic anhydride Comparative Example 7

A polymer was obtained in the same manner as in Example 1 except that the following raw materials were used.

(I) 172 g (50 mol %) of 2-hydroxy-6-naphthoic acid
(II) 76 g (25 mol %) of terephthalic acid
(III) 85 g (25 mol %) of 4,4'-dihydroxybiphenyl
22.5 mg of potassium acetate catalyst
190 g of acetic anhydride

TABLE 1

| | | Composition of Monomer (mol %) | | | | | | | Melt Viscosity (Pa · s) |
| | | (I) HNA | (II) TA | (III) BP | (IV) HBA | Discharge of Polymer | Melting Point (° C.) | Softening Temperature (° C.) | Heat Distortion Temperature (° C.) | [Measurement Temperature] |
|---|---|---|---|---|---|---|---|---|---|---|
| Ex. | 1 | 48 | 25 | 25 | 2 | Possible | 352 | 320 | 298 | 23 [380° C.] |
| | 2 | 54 | 22.5 | 22.5 | 1 | Possible | 353 | 320 | 291 | 31 [380° C.] |
| | 3 | 40 | 27 | 27 | 6 | Possible | 351 | 301 | 261 | 60 [380° C.] |
| Com. | 1 | 4 | 18 | 18 | 60 | Possible | 360 | 280 | 235 | 25 [370° C.] |
| Ex. | 2 | 35 | 25 | 25 | 15 | Possible | 322 | 223 | — | 61 [360° C.] |
| | 3 | 50 | 17.5 | 17.5 | 15 | Possible | 267 | 184 | — | 22 [300° C.] |
| | 4 | 35 | 28.5 | 28.5 | 8 | Impossible | — | — | — | — |
| | 5 | 20 | 30 | 30 | 20 | Impossible | — | — | — | — |
| | 6 | 80 | 9 | 9 | 2 | Impossible | — | — | — | — |
| | 7 | 50 | 25 | 25 | — | Impossible | — | — | — | — |

What is claimed is:

1. A wholly aromatic polyester which exhibits optical anisotropy in a molten state and which comprises, as essential constituents, the constitutional unit (I) in an amount of 40 to 75 mol %, the constitutional unit (II) in an amount of 8.5 to 30 mol %, the constitutional unit (III) in an amount of 8.5 to 30 mol % and the constitutional unit (IV) in an amount of 0.1 to 8 mol % based on the total of all constitutional units, the constitutional units (I) to (IV) being represented by the following formulas:

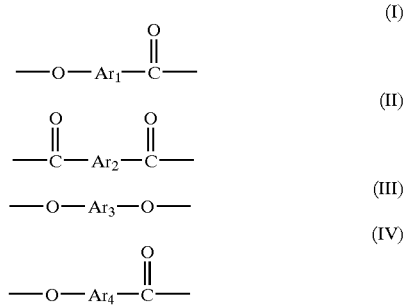

wherein $Ar_1$ is 2,6-naphthalene; $Ar_2$ is at least one selected from the group consisting of 1,2-phenylene, 1,3-phenylene and 1,4-phenylene; $Ar_3$ is at least one selected from the group consisting of 1,3-phenylene, 1,4-phenylene and the residue of a compound having at least two phenylene groups connected with each other at the para position; and $Ar_4$ is 1,4-phenylene.

2. The polyester of claim 1, which contains the constitutional unit (I) in an amount of 40 to 60 mol %, the constitutional unit (II) in an amount of 17.5 to 30 mol %, the constitutional unit (III) in an amount of 17.5 to 30 mol % and the constitutional unit (IV) in an amount of 1 to 6 mol % based on the total of all constitutional units.

3. The polyester of claim 1, wherein the ratio (I)/(IV) of the constitutional unit (I) to the constitutional unit (IV) is 6 to 150.

4. The polyester of claim 1, which has a melt viscosity of not higher than $1 \times 10^5$ Pa·s at temperatures higher than its melting point by 10 to 40° C. and a shear rate of 1,000 $sec^{-1}$.

5. The polyester of claim 1, which has a melting point of 340 to 380° C. and a difference between its melting point and its softening temperature of not higher than 50° C.

6. A polyester resin composition comprising a wholly aromatic polyester of claim 1, and an inorganic or organic filler in an amount of between 100 parts by weight to 120 parts by weight of the wholly aromatic polyester.

7. A polyester article molded from the wholly aromatic polyester of claim 1.

8. The article of claim 7, which is a relay switch part, a bobbin, an actuator, a noise reduction filter case or a hot fixing roller for OA equipment.

9. A polyester article molded from the polyester resin composition of claim 6.

* * * * *